(12) United States Patent
Hakonen et al.

(10) Patent No.: US 9,890,015 B2
(45) Date of Patent: Feb. 13, 2018

(54) ELEVATOR CONTROL APPARATUS AND METHOD FOR MINIMIZING AN ELEVATOR GROUP LOAD DIFFERENCE

(71) Applicant: KONE Corporation, Helsinki (FI)

(72) Inventors: Henri Hakonen, Espoo (FI); Janne Sorsa, Helsinki (FI); Marja-Liisa Siikonen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 15/431,411

(22) Filed: Feb. 13, 2017

(65) Prior Publication Data

US 2017/0158460 A1    Jun. 8, 2017

Related U.S. Application Data

(63) Continuation of application No. PCT/FI2014/050679, filed on Sep. 5, 2014.

(51) Int. Cl.
*B66B 1/34*    (2006.01)
*B66B 1/24*    (2006.01)

(52) U.S. Cl.
CPC .......... *B66B 1/2458* (2013.01); *B66B 1/3446* (2013.01); *B66B 2201/103* (2013.01); *B66B 2201/216* (2013.01); *Y02B 50/122* (2013.01)

(58) Field of Classification Search
CPC ............... B66B 1/2458; B66B 1/3446; B66B 2201/103; B66B 2201/216; Y02B 50/122

USPC ....... 187/247, 277, 281, 289, 293, 296, 297, 187/380–389, 391, 393
See application file for complete search history.

(56) References Cited

U.S. PATENT DOCUMENTS

| 4,708,224 | A * | 11/1987 | Schrooder | B66B 1/2458 187/387 |
| 5,984,052 | A * | 11/1999 | Cloux | B66B 1/285 187/281 |
| 6,776,264 | B2 * | 8/2004 | Tyni | B66B 1/20 187/247 |
| 6,857,506 | B1 * | 2/2005 | Tyni | B66B 1/2458 187/247 |
| 6,935,467 | B1 | 8/2005 | Tyni et al. | |

(Continued)

FOREIGN PATENT DOCUMENTS

JP    2010-168154 A    8/2010
WO    WO 2013/053648 A1    4/2013

*Primary Examiner* — Anthony Salata
(74) *Attorney, Agent, or Firm* — Birch, Stewart, Kolasch & Birch, LLP

(57) ABSTRACT

A method for controlling an elevator group including at least a first elevator and a second elevator, wherein a counterweight balance of the first elevator differs from a counterweight balance of the second elevator, the method including: controlling the elevator group; determining threshold loads for the first and second elevator separately for up and down direction, a threshold load being dependent of the counterweight balance of the corresponding elevator, wherein the threshold load being a load for which consumed energy per up-down run is approximately zero; and controlling, when allocating an elevator in response to a destination call, route determination for the first and second elevator involves minimizing a load difference from the threshold loads.

20 Claims, 2 Drawing Sheets

(56) References Cited

U.S. PATENT DOCUMENTS

| | | | |
|---|---|---|---|
| 7,416,057 B2* | 8/2008 | Kostka | B66B 1/18 187/382 |
| 7,510,054 B2* | 3/2009 | Bahjat | B66B 1/18 187/247 |
| 7,546,906 B2* | 6/2009 | Tyni | B66B 1/2458 187/247 |
| 7,694,781 B2* | 4/2010 | Sorsa | B66B 1/2458 187/382 |
| 7,909,143 B2* | 3/2011 | Tyni | B66B 1/2458 187/247 |
| 7,967,113 B2* | 6/2011 | Smith | B66B 5/027 187/289 |
| 8,172,042 B2* | 5/2012 | Wesson | B66B 1/302 187/290 |
| 9,016,440 B2* | 4/2015 | Finschi | B66B 1/2458 187/382 |
| 9,573,789 B2* | 2/2017 | Appana | B66B 1/2408 |
| 2008/0105499 A1 | 5/2008 | Tyni et al. | |
| 2008/0185234 A1 | 8/2008 | Harkonen | |
| 2009/0218175 A1 | 9/2009 | Wesson et al. | |
| 2012/0055742 A1 | 3/2012 | Takeda | |

* cited by examiner

ELEVATOR CONTROL APPARATUS AND METHOD FOR MINIMIZING AN ELEVATOR GROUP LOAD DIFFERENCE

CROSS REFERENCE TO RELATED APPLICATIONS

This application is a Continuation of PCT International Application No. PCT/FI2014/050679, filed on Sep. 5, 2014, the entire content of which is herein expressly incorporated by reference into the present application.

FIELD OF THE INVENTION

The invention relates to route determination of an elevator group comprising at least two elevators.

BACKGROUND

When an elevator group comprising at least two elevators is to be controlled, it is an ongoing challenge to be able to determine an optimal solution for route determination for the elevators. One possibility for optimizing route determination is to minimize total energy consumption of the elevator group. But, since there are also other parameters relating to route determination, a route having the lowest energy consumption may not be the best one when taking into account also the other parameters.

SUMMARY

According to a first aspect of the invention, there is provided an elevator control apparatus comprising at least one processor and at least one memory comprising computer program code for one or more programs. The at least one memory and the computer program code operating together with the at least one processor cause the apparatus to: control an elevator group comprising at least a first elevator and a second elevator, wherein a counterweight balance of the first elevator differs from a counterweight balance of the second elevator; determine threshold loads for the first and second elevator separately for up and down direction for each elevator, a threshold load being dependent of the counterweight balance of the corresponding elevator and being a load for which consumed energy per up-down run is approximately zero; and control, when allocating an elevator in response to a destination call, route determination for the first and second elevator comprises minimizing a load difference from the threshold loads.

In one embodiment, the threshold loads determine a preferred maximum load in up direction and a preferred minimum load in down direction.

In one embodiment, the at least one memory and the computer program code operate together with the at least one processor to cause the apparatus to: control the route determination such that in up direction a load of the allocated elevator is below the load threshold of the allocated elevator for up direction.

In one embodiment, the at least one memory and the computer program code operate together with the at least one processor to cause the apparatus to: control the route determination such that in down direction a load of the allocated elevator is above the load threshold of the allocated elevator for down direction.

In one embodiment, the at least one memory and the computer program code operate together with the at least one processor to cause the apparatus to: take into account, in the route determination, the threshold loads as a fine term in order to prevent energy inefficient route determinations.

According to a second aspect of the invention, there is provided an elevator system comprising a plurality of elevators comprising at least a first elevator and a second elevator, wherein a counterweight balance of the first elevator differs from a counterweight balance of the second elevator; and an elevator control apparatus of any of claims 1-5.

According to a third aspect of the invention, there is provided a method for controlling an elevator group comprising at least a first elevator and a second elevator, wherein a counterweight balance of the first elevator differs from a counterweight balance of the second elevator. The method comprises controlling the elevator group comprising at least the first elevator and the second elevator; determining thresholds loads for the first and second elevator separately for up and down direction for each elevator, a threshold load being dependent of the counterweight balance of the corresponding elevator and being a load for which consumed energy per up-down run is approximately zero; and controlling, when allocating an elevator in response to a destination call, route determination for the first and second elevator comprises minimizing a load difference from the threshold loads.

In one embodiment, threshold loads determine a preferred maximum load in up direction and a preferred minimum load in down direction.

In one embodiment, controlling, when allocating an elevator in response to a destination call, route determination for the first and second elevator by minimizing load difference from the threshold loads causing energy consumption comprises controlling the route determination such that in up direction a load of the allocated elevator is below the load threshold of the allocated elevator for up direction.

In one embodiment, controlling, when allocating an elevator in response to a destination call, route determination for the first and second elevator by minimizing load difference from the threshold loads causing energy consumption comprises controlling the route determination such that in down direction a load of the allocated elevator is above the load threshold of the allocated elevator for down direction.

In one embodiment, the method further comprises taking into account, in the route determination, the threshold loads as a fine term in order to prevent energy inefficient route determinations.

According to a fourth aspect of the invention, there is provided a computer program comprising program code, which when executed by a processor, performs the method of the third aspect.

In one embodiment, the computer program is embodied on a computer-readable medium.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
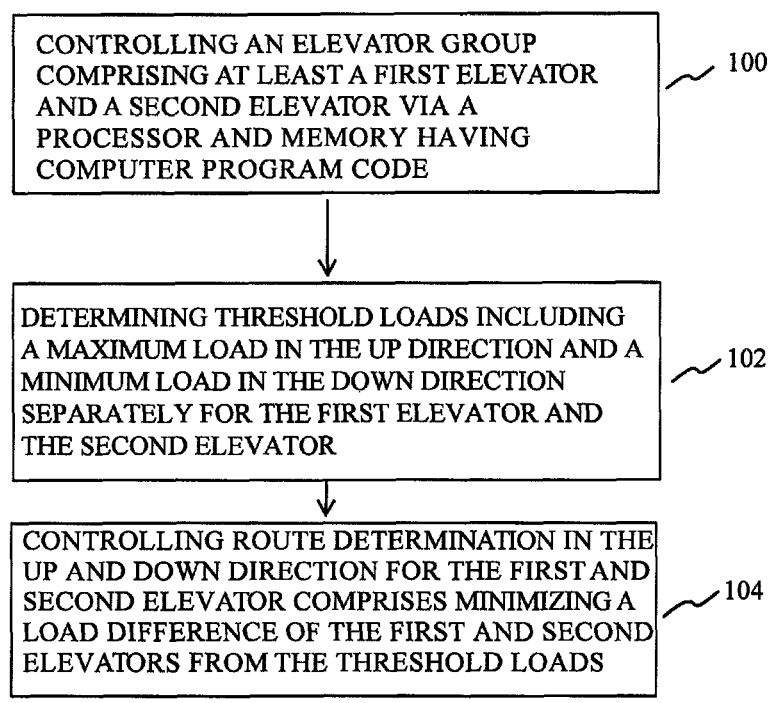
FIG. 1 is a flow diagram illustrating a method in accordance with one embodiment of the invention.
Figure 2:
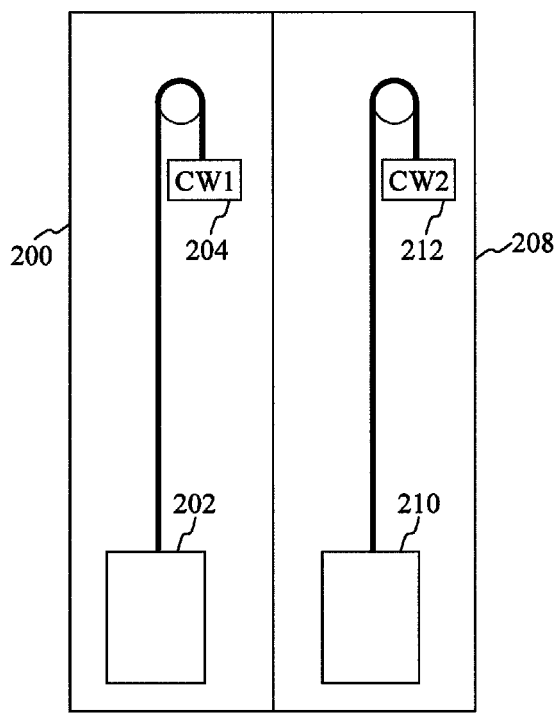
FIG. 2 is a block diagram illustrating an elevator system in accordance with one embodiment of the invention.

FIG. 1 is a flow diagram illustrating a method in accordance with one embodiment of the invention. FIG. 1 will be discussed together with FIG. 2. The method disclosed in FIG. 1 is arranged to control route determination for a first elevator 202 and a second elevator 210. FIG. 2 provides a simple example disclosing only two elevator shafts 200 and 208 and two elevator cars 202 and 210 forming an elevator group.

Each elevator is associated with a counterweight. A counterweight 204 relating to the first elevator car 202 has a different counterweight balance than a counterweight 212 relating to the second elevator car 210.

In step 100 the elevator group comprising at the first elevator 202 and the second elevator 210 is controlled.

In step 102 determining threshold loads are determined for the first 202 and second elevator 210 separately for up and down direction for each elevator. A threshold load is dependent of the counterweight balance of the corresponding elevator. The threshold load is determined to be a load for which consumed energy per up-down run is approximately zero. For example, if the first counterweight balance 204 is 40%, the threshold load for up direction is, for example, 25% of the rated load. For down direction, if the first counterweight balance 204 is 40%, the threshold load for down direction is, for example, 55% of the rated load. The threshold loads may be proportional to the counterweight balance. Thus, for example, if the second counterweight balance 212 is 60%, the threshold load for up direction is, for example, 45% of the rated load. For the down direction, if the second counterweight balance 212 is 60%, the threshold load for down direction is, for example, 75% of the rated load.

In step 104, route determination is controlled, when allocating an elevator in response to a destination call, for the first 202 and second elevator 210 such that loads of the first 202 and second elevators 210 are minimized from the threshold loads.

The method disclosed above may not always provide a route that would be the most energy efficient route. Based on the method, however, it is possible to avoid bad route determinations. Further, when loads of the first 202 and second elevators 210 are minimized from the threshold loads, energy consumption may be greater than zero but simultaneously it may enable choosing a route that optimizes other route optimization parameters than energy consumption.

In one embodiment, the threshold loads for an elevator (in other words, a threshold load for up direction and a threshold load in down direction) is determined to be loads for which consumed energy per up-down run is approximately zero when driving an elevator from the lowest floor to the highest floor and from the highest floor back to the lowest floor.

In one embodiment, the threshold loads determine a preferred maximum load in up direction and a preferred minimum load in down direction.

In one embodiment, controlling, when allocating an elevator in response to a destination call, route determination for the first 202 and second elevator 210 comprises minimizing load difference from the threshold loads causing energy consumption. In another example it is possible to determine a limit how much it is possible to deviate from the threshold loads when causing energy consumption. The limit may be determined separately for each elevator and for each direction.

In one example, the route determination is controlled such that in up direction a load of the allocated elevator is below the load threshold of the allocated elevator for up direction. This enables a solution where the energy consumption is less or equal to zero. In another example, the route determination is controlled such that in down direction a load of the allocated elevator is above the load threshold of the allocated elevator for down direction. Also this enables a solution where the energy consumption is less or equal to zero. Yet in another example the route determination is controlled such that in up direction a load of the allocated elevator is below the load threshold of the allocated elevator for up direction and such that in down direction a load of the allocated elevator is above the load threshold of the allocated elevator for down direction.

In one embodiment, taking into account, in the route determination, the threshold loads as a fine term in order to prevent energy inefficient route determinations. This may implemented so that when calculating a cost function for a route (in other words, when allocating an elevator), threshold loads may be taken into account in the cost function by using specific coefficients for the threshold loads.

Figure 3:
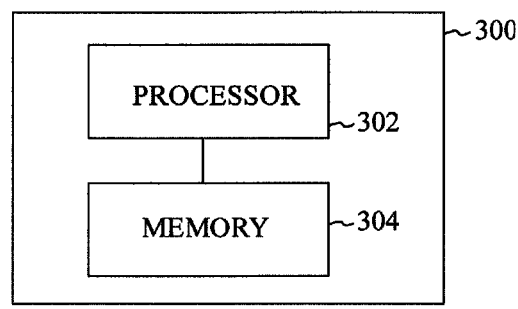
FIG. 3 is a block diagram illustrating an elevator control apparatus in accordance with one embodiment of the invention.

FIG. 3 is a block diagram illustrating an elevator control apparatus 300 in accordance with one embodiment of the invention The elevator control apparatus 300 comprises a processor 302 connected to a memory 304. The elevator control apparatus 300 may also comprise several processors or memories. The memory 304 or memories comprises at least one computer program which, when executed by the processor 302 or processors, causes the elevator control apparatus 300 to perform the programmed functionality.

The exemplary embodiments of the invention can be included within any suitable device, for example, including any suitable servers, workstations, PCs, laptop computers, capable of performing the processes of the exemplary embodiments, and which can communicate via one or more interface mechanisms. The exemplary embodiments may also store information relating to various processes described herein.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like.

While the present inventions have been described in connection with a number of exemplary embodiments, and implementations, the present inventions are not so limited, but rather cover various modifications, and equivalent arrangements, which fall within the purview of prospective claims.

Furthermore, the embodiments of the invention described herein may be used in any combination with each other.

Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. An elevator control apparatus comprising:
at least one processor; and
at least one memory comprising computer program code for one or more programs, the at least one memory and the computer program code operating together with the at least one processor to cause the apparatus to:
control an elevator group comprising at least a first elevator and a second elevator, wherein a counterweight balance of the first elevator differs from a counterweight balance of the second elevator;
determine threshold loads for the first and second elevator separately for up and down direction for each elevator, a threshold load being dependent of the counterweight balance of the corresponding elevator and being a load for which consumed energy per up-down run is approximately zero; and
control, when allocating an elevator in response to a destination call, route determination for the first and second elevators by minimizing a load difference of the first and second elevators from the threshold loads.

2. The elevator control apparatus according to claim 1, wherein the threshold loads determine a preferred maximum load in up direction and a preferred minimum load in down direction.

3. The elevator control apparatus according to claim 1, wherein the at least one memory and the computer program code operate together with the at least one processor to cause the apparatus to:
control the route determination such that in up direction a load of the allocated elevator is below the load threshold of the allocated elevator for up direction.

4. The elevator control apparatus according to claim 1, wherein the at least one memory and the computer program code operate together with the at least one processor to cause the apparatus to:
control the route determination such that in down direction a load of the allocated elevator is above the load threshold of the allocated elevator for down direction.

5. The elevator control apparatus according to claim 1, wherein the at least one memory and the computer program code operate together with the at least one processor to cause the apparatus to:
take into account, in the route determination, the threshold loads as a fine term in order to prevent energy inefficient route determinations.

6. An elevator system comprising:
a plurality of elevators comprising at least a first elevator and a second elevator, wherein a counterweight balance of the first elevator differs from a counterweight balance of the second elevator; and
the elevator control apparatus of claim 1.

7. A method for controlling an elevator group comprising at least a first elevator and a second elevator, wherein a counterweight balance of the first elevator differs from a counterweight balance of the second elevator, the method comprising:
controlling the elevator group comprising at least the first elevator and the second elevator;
determining threshold loads for the first and second elevator separately for up and down direction for each elevator, a threshold load being dependent of the counterweight balance of the corresponding elevator and being a load for which consumed energy per up-down run is approximately zero; and
controlling, when allocating an elevator in response to a destination call, route determination for the first and second elevators comprises minimizing a load difference from the threshold loads.

8. The method according to claim 7, wherein the threshold loads determine a preferred maximum load in up direction and a preferred minimum load in down direction.

9. The method according to claim 7, wherein controlling, when allocating an elevator in response to a destination call, route determination for the first and second elevator by minimizing load difference from the threshold loads causing energy consumption comprises:
controlling the route determination such that in up direction a load of the allocated elevator is below the load threshold of the allocated elevator for up direction.

10. The method according to claim 7, wherein controlling, when allocating an elevator in response to a destination call, route determination for the first and second elevator by minimizing load difference from the threshold loads comprises:
controlling the route determination such that in down direction a load of the allocated elevator is above the load threshold of the allocated elevator for down direction.

11. The method according to claim 7, further comprising:
taking into account, in the route determination, the threshold loads as a fine term in order to prevent energy inefficient route determinations.

12. A computer program comprising program code, which when executed by a processor, performs the method of claim 7.

13. The computer program according to claim 12, wherein the computer program is embodied on a computer-readable medium.

14. The elevator control apparatus according to claim 2, wherein the at least one memory and the computer program code operate together with the at least one processor to cause the apparatus to:
control the route determination such that in up direction a load of the allocated elevator is below the load threshold of the allocated elevator for up direction.

15. The elevator control apparatus according to claim 2, wherein the at least one memory and the computer program code operate together with the at least one processor to cause the apparatus to:
control the route determination such that in down direction a load of the allocated elevator is above the load threshold of the allocated elevator for down direction.

16. The elevator control apparatus according to claim 3, wherein the at least one memory and the computer program code operate together with the at least one processor to cause the apparatus to:
control the route determination such that in down direction a load of the allocated elevator is above the load threshold of the allocated elevator for down direction.

17. The elevator control apparatus according to claim 2, wherein the at least one memory and the computer program code operate together with the at least one processor to cause the apparatus to:

take into account, in the route determination, the threshold loads as a fine term in order to prevent energy inefficient route determinations.

18. The elevator control apparatus according to claim 3, wherein the at least one memory and the computer program code operate together with the at least one processor to cause the apparatus to:

take into account, in the route determination, the threshold loads as a fine term in order to prevent energy inefficient route determinations.

19. The elevator control apparatus according to claim 4, wherein the at least one memory and the computer program code operate together with the at least one processor to cause the apparatus to:

take into account, in the route determination, the threshold loads as a fine term in order to prevent energy inefficient route determinations.

20. An elevator system comprising:

a plurality of elevators comprising at least a first elevator and a second elevator, wherein a counterweight balance of the first elevator differs from a counterweight balance of the second elevator; and the elevator control apparatus of claim 2.

* * * * *